(12) United States Patent
Nakamura (10) Patent No.: US 8,743,127 B2
(45) Date of Patent: Jun. 3, 2014

(54) INFORMATION PROCESSING APPARATUS, INFORMATION PROCESSING METHOD, AND PROGRAM

(75) Inventor: Sensaburo Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 210 days.

(21) Appl. No.: 13/223,471

(22) Filed: Sep. 1, 2011

(65) Prior Publication Data

US 2012/0007886 A1    Jan. 12, 2012

(30) Foreign Application Priority Data

Sep. 7, 2010 (JP) ................................ P2010-199498

(51) Int. Cl.
*G06T 13/00* (2011.01)
(52) U.S. Cl.
USPC .......................................... 345/473; 715/972
(58) Field of Classification Search
USPC ............ 345/473, 474, 475; 386/278; 715/972
See application file for complete search history.

(56) References Cited

U.S. PATENT DOCUMENTS

| 6,661,965 B2* | 12/2003 | Yamamoto ..................... 386/279 |
| 6,694,319 B1* | 2/2004 | Schmidt ................................ 1/1 |
| 2004/0130550 A1* | 7/2004 | Blanco et al. ................. 345/473 |
| 2010/0178024 A1* | 7/2010 | Agarwal et al. ................. 386/52 |

FOREIGN PATENT DOCUMENTS

JP    4-245088    9/1992

* cited by examiner

*Primary Examiner* — Kee M Tung
*Assistant Examiner* — Haixia Du
(74) *Attorney, Agent, or Firm* — Frommer Lawrence & Haug LLP; William S. Frommer (57) ABSTRACT

Disclosed herein is an information processing apparatus configured to edit video, including: a computer graphics image generation block configured to execute realtime rendering of a computer graphics animation by use of a timeline time with a fraction permitted for a seconds value that is a minimum unit as a parameter indicative of a temporal position of the computer graphics animation; an operation input block configured to enter a user operation for specifying progression of the computer graphics animation; and a control block configured to control the computer graphics image generation block in response to the user operation entered through the operation input block.

6 Claims, 7 Drawing Sheets

FIG. 2

| | 1/4X SPEED | 1/2X SPEED | 1X SPEED | 2X SPEED |
|---|---|---|---|---|
| TIME CODE | 01:00:00:0.25 | 01:00:00:0.5 | 01:00:00:01 | 01:00:00:02 |
| TIMELINE HOURS | 01:00:1/120 | 01:00:1/60 | 01:00:1/30 | 01:00:2/30 |

TIMING WITH WHICH SECOND FRAME IS DISPLAYED AT 30 FRAMES/SECOND AT EACH PROGRESSION SPEED

INFORMATION PROCESSING APPARATUS, INFORMATION PROCESSING METHOD, AND PROGRAM

BACKGROUND

The present disclosure relates to an information processing apparatus, an information processing method, and a program and, more particularly, to an information processing apparatus, an information processing method, and a program that are suitable in using CG (Computer Graphics) animation for video materials (clips) of television programs for example.

The frame rate of television broadcasting video is set to a predetermined value by broadcasting standards (30 frames/second for example). Consequently, many video materials for use in programs have the same frame rate. Each of these video materials is given, for the information indicative of a temporal position, a time code with a frame used as the minimum unit (refer to Japanese Patent Laid-open No. Hei 4-245088, for example).

Devices for editing these video materials use a time code for the specification of a temporal position and a section of each video material.

Each time code is noted as HH:MM:SS:FF indicative of HH hours, MM minutes, SS seconds, and FF frames. For example, if a frame rate is 30 frames/second, then FF is an integer of 0 to 29. It should be noted however that, if a video terminal is based on interlace, the value FF is substantially in units of 0.5 in order to make discrimination between odd-number field and even-number field.

This holds true the case where related-art CG animation is used for video materials; time code HH:MM:SS:FF is given to each frame of a moving image based on CG produced and rendered with a frame rate of 30 frames/second in advance.

It should be noted that the recent increase in the processing speeds of computers for producing CG animation allows so-called realtime rendering in which CG animation is rendered for use as broadcasting materials without producing the CG animation for use as broadcasting materials in advance.

Further, the recent increase in the processing speeds allows the progression (play) of CG animation based on realtime rendering at variable speeds, at speeds higher than 1× speed (1.5× speed, 2× speed, or 3× speed, for example), or at lower speeds than 1× speed (½× speed, ¼× speed, or ⅒× speed, for example).

Figure 1:
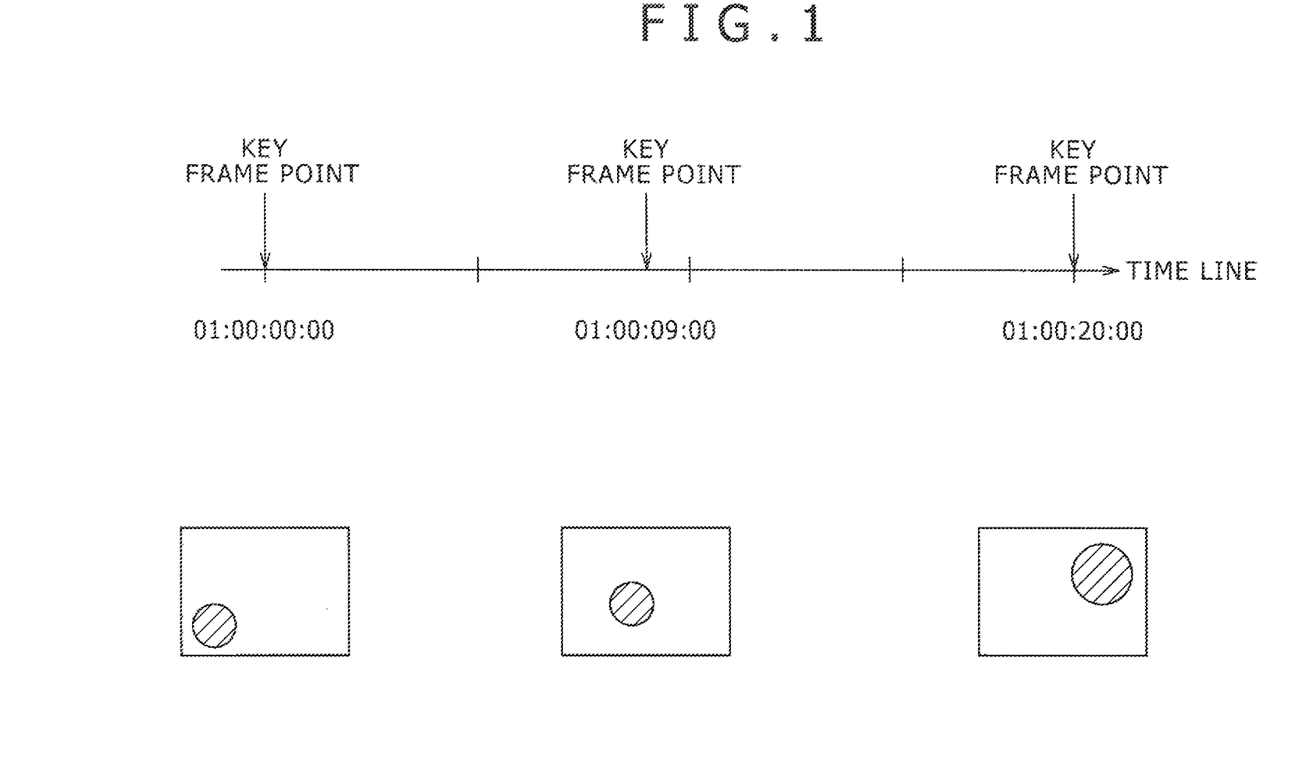
FIG. 1 is a schematic diagram illustrating realtime rendering of a CG animation.

Referring to FIG. 1, there is shown a schematic diagram illustrating realtime rendering of CG animation.

As shown in the figure, in realtime rendering a CG animation of 20 seconds from start time 01:00:00:00 to end time 01:00:20:00, data for describing contents of a CG virtual space is prepared only for the frame of key frame points. In the example shown in FIG. 1, time codes 01:00:00:00, 01:00:09:00, and 01:00:20:00 are key frame points, respectively. For the frames other than the frames of key frame points, data is interpolated on the basis of the key frames. The creation of the data for interpolated frames can cope with not only the object movement within a CG virtual space but also the enlargement and reduction of an object.

Figure 2:
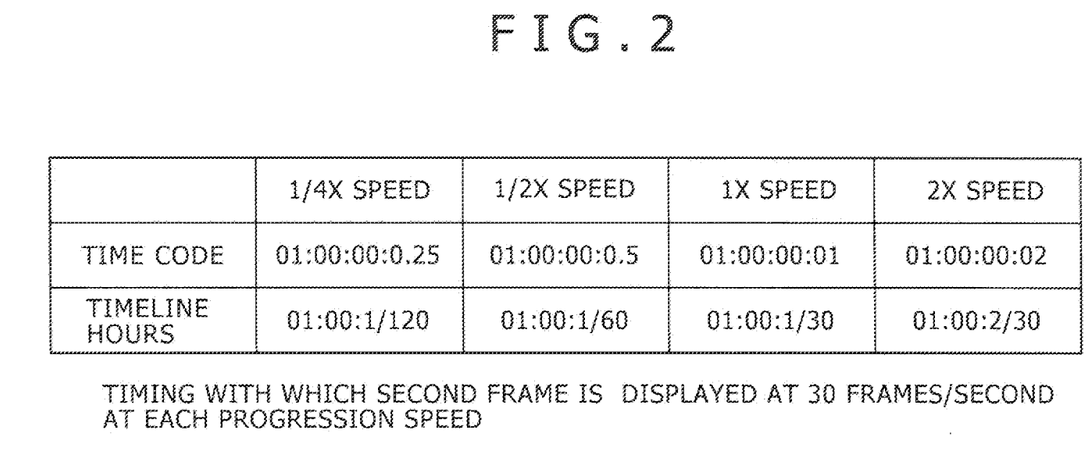
FIG. 2 is a diagram illustrating a relationship of time codes and timeline times with an CG animation made progress variable speeds.

Referring to FIG. 2, there is shown timings with which a second frame is displayed when a CG animation is made progress at various speeds. These timings may also be regarded as a display intervals between frames.

The timing with which the second frame is displayed is indicated by time code 01:00:00:01 if the frame rate is 30 frames/second at 1× speed and timeline time 01:00:00.033 if indicated by a timeline time with values below an integer permitted for units of seconds (in the figure, the timeline time is expressed by a fraction 1/30). At 2× speed, the timing is indicated by time code 01:00:00:02 and timeline time 01:00:00.067 if indicated by a timeline time with values below an integer permitted for units of seconds (in the figure, the timeline time is expressed by a fraction 2/30).

In the case of ½× speed, time code 01:00:00:0.5 is given, which is expressed by timeline time as 01:00:00.017 (in the figure, the timeline time is expressed by a fraction 1/60). In the case of ¼× speed, time code 01:00:00:0.25 is given, which is expressed by timeline time as 01:00:00.008 (in the figure, the timeline time is expressed by a fraction 1/120). Therefore, it is seen that, if the CG animation is made progress at ¼× speed, the value of the frame of time code is in units of 0.25 and the value of timeline time is in units of 1/120.

To be more specific, at ¼× speed, the second frame is generated by the interpolation corresponding to timeline time 01:00:00.008 and the third frame is generated by the interpolation corresponding to timeline time 01:00:00.17.

It should be noted however that the time code changes depending on the frame rate, so that, for one of data formats of CG animation, a timeline time with the value below integer permitted for second that is the minimum unit is employed in order to maintain the universality compatible with any frame rates.

SUMMARY

As described above, in realtime rendering CG animation, a timeline time is employed but, if the timeline time is used for a broadcasting material, a time code is applied for the synchronization with another device, resulting in the following adverse effects.

For example, if a CG animation is made progress at ¼× speed by the editing of broadcasting video and this CG animation is stopped halfway by a stop instruction, then the CG animation may stop with an output image with a fraction (a value to the right side of decimal point) caused in a time code of a time line at the time of production. Namely, the CG animation may stop at a position where a frame value has a fraction such as time code 01:00:11:16.75.

However, the time code can handle only an integer (in the case of interlace, any of the numbers up to 0.5 are allowed) as a frame value, so that the above-mentioned stopped state is held as time code 01:00:11:16. Consequently, when the progression of the CG animation is resumed, the video rendering of this CG animation is resumed from time code 01:00:11:16 that goes back from the stopped time, resulting in an unnatural and uncomfortable video.

Therefore, the present disclosure addresses the above-identified and other problems associated with related-art methods and apparatuses and solves the addressed problems by providing an information processing apparatus, an information processing method, and a program that are configured to make CG animation to be realtime rendered variable-speed progress without giving a sense of unnaturalness in synchronization with existing broadcasting-associated devices and video materials based on time codes.

In carrying out the technology and according to one mode thereof, there is provided an information processing apparatus for editing video. This information processing apparatus has a CG (Computer Graphics) image generation block configured to execute realtime rendering of a CG animation by use of a timeline time with a fraction permitted for a seconds value that is a minimum unit as a parameter indicative of a temporal position of the CG animation; an operation input block configured to enter a user operation for specifying progression of the CG animation; and a control block configured to control the CG image generation block in response to the user operation entered through the operation input block. In this information processing apparatus, the control block has a hold portion configured to hold time code HH:MM:SS:FF with a fraction permitted for frame value FF of a minimum unit as a parameter indicative of stopped temporal position when the progression of the CG animation being realtime rendered is stopped; and a conversion portion configured to convert the time code HH:MM:SS:FF held in the hold portion into the timeline time and notify the CG image generation block of the timeline time.

In this information processing apparatus, the control block further has an adjustment portion configured to execute adjustment of removing a fraction occurring in frame value FF of the time code HH:MM:SS:FF held in the hold portion, wherein the conversion portion converts the time code HH:MM:SS:FF after conversion into the timeline time.

In this information processing apparatus, if the progression of the CG animation being realtime rendered is stopped and then restarted, the adjustment portion executes the adjustment only when a progression speed after the restart satisfies a predetermined condition.

In this information processing apparatus, if the progression of the CG animation being realtime rendered is stopped and then restarted and a progression speed after the restart is equal to a progression speed before the stop, the adjustment portion does not execute the adjustment.

In this information processing apparatus, the control block further controls a video output block that uses the time code as a parameter indicative of a temporal position in response to the user operation entered through the operation input block and the adjustment portion executes the adjustment only when the progression of the CG animation being realtime rendered is synchronized with a video material outputted from the video output block.

In carrying out the technology and according to another mode thereof, there is provided an information processing method for an information processing apparatus having a CG (Computer Graphics) image generation block for realtime rendering a CG animation by use of a timeline time with a fraction permitted for a seconds value that is a minimum unit as a parameter indicative of a temporal position of the CG animation. This information processing method includes: entering a user operation for specifying progression of the CG animation; and controlling the CG image generation block in response to the user operation entered by the entering step. In this configuration, the control step holds time code HH:MM:SS:FF with a fraction permitted for frame value FF of a minimum unit as a parameter indicative of stopped temporal position when the progression of the CG animation being realtime rendered is stopped and converts the held time code HH:MM:SS:FF held into the timeline time and notifies the CG image generation block of the timeline time.

In carrying out the technology and according to still another mode thereof, there is provided a computer program for making a computer function as a CG (Computer Graphics) image generation block configured to execute realtime rendering of a CG animation by use of a timeline time with a fraction permitted for a seconds value that is a minimum unit as a parameter indicative of a temporal position of the CG animation; an operation input block configured to enter a user operation for specifying progression of the CG animation; and a control block configured to control the CG image generation block in response to the user operation entered through the operation input block. In this configuration, the control block has a hold portion configured to hold time code HH:MM:SS:FF with a fraction permitted for frame value FF of a minimum unit as a parameter indicative of stopped temporal position when the progression of the CG animation being realtime rendered is stopped and a conversion portion configured to convert the time code HH:MM:SS:FF held in the hold portion into the timeline time and notify the CG image generation block of the timeline time.

In one mode of the present technology, when the progression of a CG animation being realtime rendered is stopped, time code HH:MM:SS:FF is held as a parameter indicative of a temporal position of the stop, the held time code HH:MM:SS:FF is converted into a timeline time, and the timeline time thus obtained is transmitted to the CG image generation block.

As described and according to one mode of the present technology, in synchronization with an existing broadcasting device and a video material based on time codes, a CG animation to be realtime rendered can be made progress at variable speeds without causing the sense of unnaturalness. The novel configuration significantly enhances ease of operation and significantly increases added values of images for use in broadcasting and so on.

BRIEF DESCRIPTION OF THE DRAWINGS

Other features and modes of the technology will become apparent from the following description of embodiments with reference to the accompanying drawings in which.

DETAILED DESCRIPTION OF THE PREFERRED EMBODIMENTS

This technology will be described in further detail by way of embodiments thereof with reference to the accompanying drawings.

Embodiments

Exemplary Configuration of a Video Editing Apparatus

Figure 3:
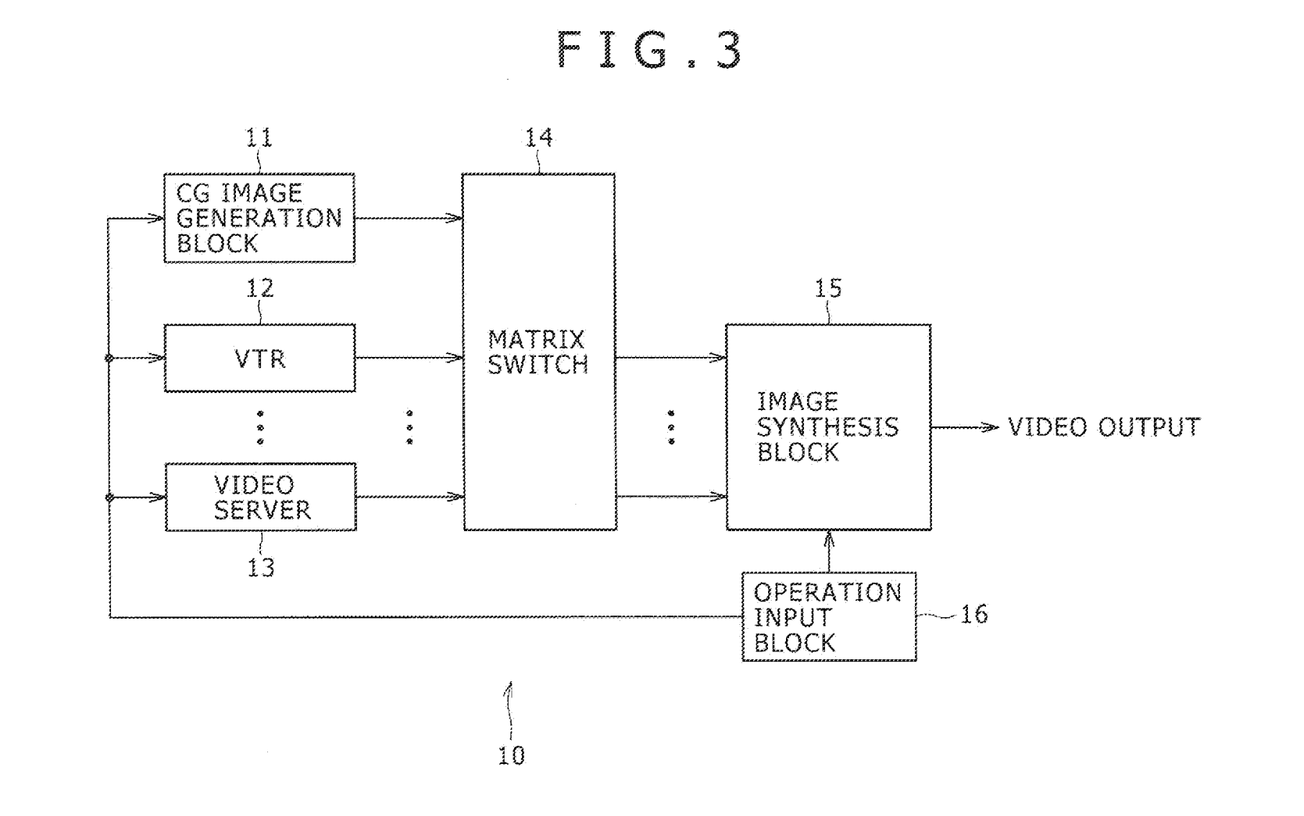
FIG. 3 is a block diagram illustrating an exemplary configuration of a video editing apparatus practiced as one embodiment of the technology.

Now, referring to FIG. 3, there is shown a block diagram illustrating an exemplary configuration of a video editing apparatus practiced as one embodiment of the disclosure.

The video editing apparatus 10 is operated by an editor who edit the video of television programs, for example.

The video editing apparatus 10 is made up of a CG image generation block 11, a VTR (Video Tape Recorder) 12, a video server 13, a matrix switch 14, an image synthesis block 15, and an operation input block 16. To the components of the video editing apparatus 10, a common synchronous signal is supplied in order to align the operation phases of these components. For the entire video editing apparatus 10, time code HH:MM:SS:FF is used as a parameter indicative of a temporal position of each video material. It should be noted that a timeline time is used for the control of the CG image generation block 11 as a parameter indicative of a temporal position.

Controlled by parameters such as a timeline time and so on supplied from the operation input block 16, the CG image generation block 11 makes a CG animation progress at variable speeds for realtime rendering and outputs a resultant video to the matrix switch 14.

Controlled by parameters such as a time code supplied from the operation input block 16, the VTR 12 outputs a video material recorded to a video tape that is a recording media to the matrix switch 14. Controlled by parameters such as a time code supplied from the operation input block 16, the video server 13 decodes a video material encoded and recorded to a recording media such as a hard disk drive and outputs the decoded video material to the matrix switch 14. It is also practicable to arrange a device that outputs video materials to the matrix switch 14, in addition to the CG image generation block 11, VTR 12, and the video server 13.

In accordance with a selective operation done by an editor, the matrix switch 14 selects some of the two or more video materials entered from the CG image generation block 11, the VTR 12, the video server 13, and so on and outputs the selected video materials to the image synthesis block 15.

In accordance with a play operation done and entered by the editor on a video material, the operation input block 16 controls the CG image generation block 11, the VTR 12, and the video server 13 to output the video material to the matrix switch 14. In accordance with an editing operation done and entered by the editor, the image synthesis block 15 synthesizingly manipulates the video material entered from the matrix switch 14 and outputs the manipulated video material to a succeeding stage.

Figure 4:
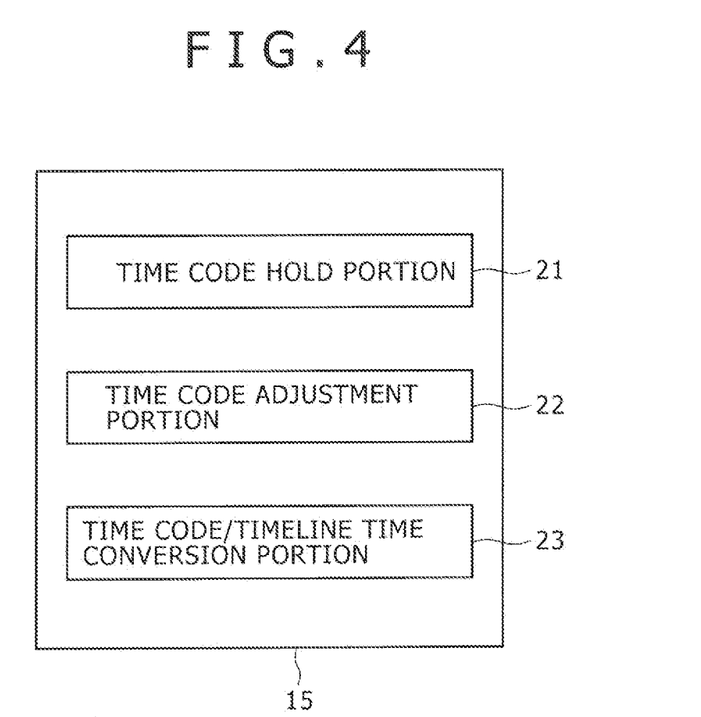
FIG. 4 is a block diagram illustrating an exemplary detail configuration of an image synthesis block shown in FIG. 3.

Referring to FIG. 4, there is shown components of the operation input block 16 that are associated with the control of the CG image generation block 11.

A time code hold portion 21 holds a parameter indicative of a temporal position of a CG animation being made progress in the CG image generation block 11 by a time code also applied to the VTR 12 and video server 13. It should be noted that the time to be held here is one that is permitted in the fraction number thereof to the frame value FF (namely, the time code hold portion 21 must have means of holding a fraction number having a constant number of digits).

A time code adjustment portion 22 adjusts a time code held in the time code hold portion 21 by truncating the fraction caused on the frame value in accordance with a reproduction speed of the time code.

A time code/timeline time conversion portion 23 converts the adjusted time code (some time codes are not adjusted because no adjustment is required) into a timeline time on the basis of a frame rate. Then, the timeline time obtained by the conversion is used for control on the CG image generation block 11. The initial value of a frame rate is 30 frames/seconds but variable depending on the operation.

Returning back to FIG. 3, the operation input block 16 is a user interface for controlling the progression of a CG animation in the CG image generation block 11 and the reproduction of video materials in the VTR 12 and the video server 13, using a time code for a parameter indicative of a temporal position of each video material. The operation input block 16 incorporates a control block for executing processing that will be described later and outputs control signals corresponding to the operations done by the editor through this user interface to the other components of the video editing apparatus 10.

Figure 5:
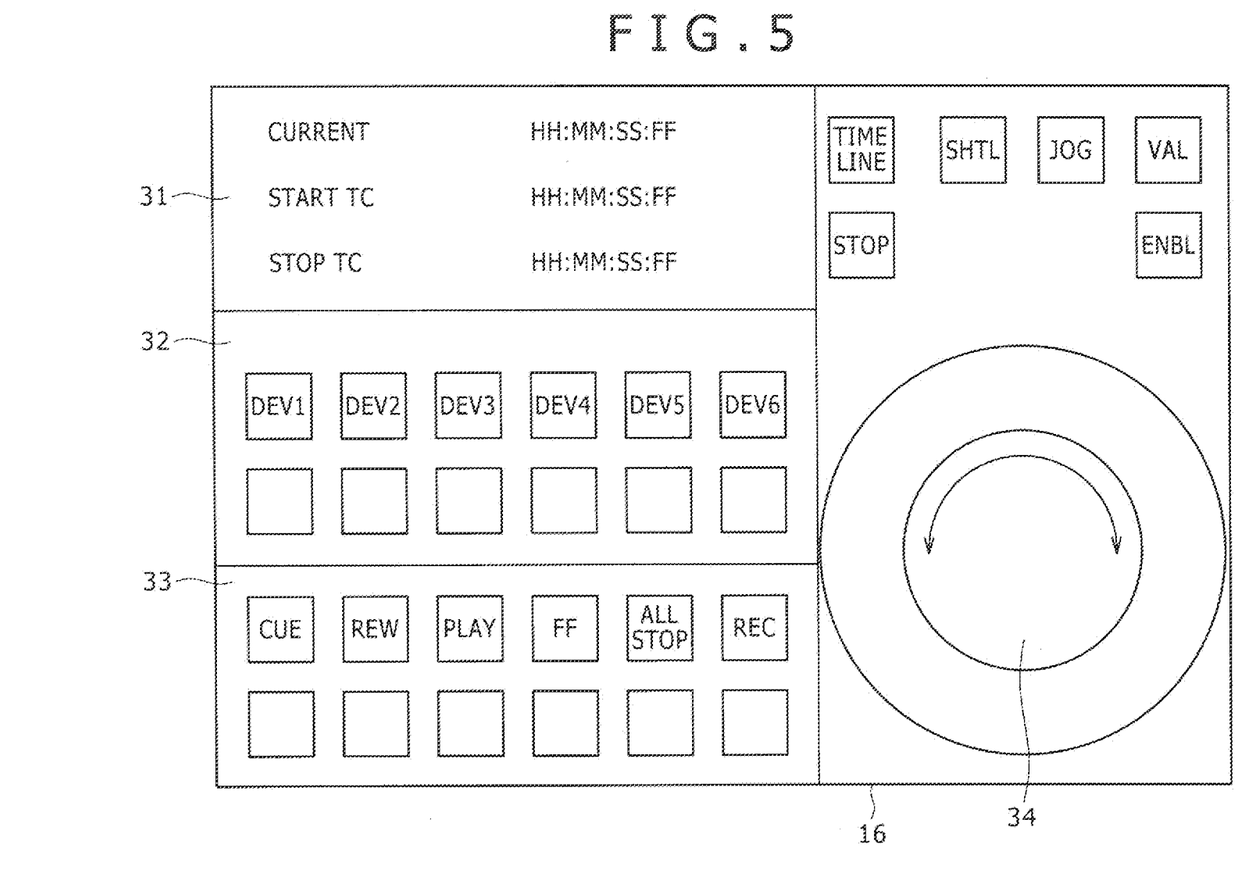
FIG. 5 is a schematic diagram illustrating an exemplary configuration of a user interface in an operation input block.

Referring to FIG. 5, there is shown an exemplary configuration of the user interface of the operation input block 16. This user interface has a display section 31, a program button section 32, an edit button section 33, and a jog shuttle dial 34.

The display section 31 displays a current temporal position (CURRENT), a start position (START TC), and a stop position (STOP TC) of a video material to be controlled in time code HH:MM:SS:FF. The start position of a video material is normally 01:00:00:00 but may be set to 00:00:00:00 as required.

The program button section 32 is made up of two or more buttons for selecting a device to be controlled (the CG image generation block 11, the VTR 12, or the video server 13) and selecting a video material to be controlled on the device to be controlled.

The edit button section 33 is made up of two or more buttons for entering various operations (CUE, REW, PLAY, FF, ALL STOP, REC, and so on) to be executed on the video material to be controlled.

The jog shuttle dial 34 is operated to change the speed of the play of a video material (in the case of a CG animation, the speed of the progression thereof). For example, turning the jog shuttle dial 34 to the right increases the speed and turning the jog shuttle dial 34 to the left decreases the speed.

It should be noted that the jog shuttle dial 34 may be configured to set the play speed to a given real value (namely, the jog shuttle dial 34 may be configured to execute transmission with a given real numbers); however, if this value includes a floating point, an error may be caused by internal computational processing, thereby causing a deviation from the intention of the editor (or the operator) in the results of long-time play. In order to prevent this deviation, the values that can be set by the jog shuttle dial 34 may be limited to the values that do not cause an error. To be more specific, the value to the right of the decimal point may be limited to a sum of inverse numbers of a power of two; for example, the value to the right of decimal point may be limited to a multiple number of $1/(2 \exp(-5))=0.0625$.

As described above, the operation input block 16 uses a time code for a parameter indicative of a temporal position of a video material; it is also practicable for the operation input block 16 to have a user interface that uses a time code time for a parameter indicative of a temporal position.

Description of Operation

The following describes control to be executed on the CG image generation block 11 in the video editing apparatus 10.

If a CG animation progressing in the CG image generation block 11 is stopped under the control of the operation input block 16, then a time code (the fraction permitted for frame value FF) indicative of that stop position is held in the time code hold portion 21.

Therefore, if a CG animation that has been progressing at a speed lower than 1× speed (hereafter referred to as slow progression) is stopped, a fraction is caused in frame value FF of time code in the time code hold portion 21.

First Pattern

In restarting a CG animation that was stopped from the above-mentioned slow progression at the same speed as the speed before the stop, the time code held in the time code hold portion 21 is converted into a timeline time without adjustment and the obtained timeline time is transmitted to the CG image generation block 11 for restarting the progression:

Second Pattern

In restarting a CG animation that stopped from the slow progression at 1× speed that is different from the speed before the stop, the adjustment is executed to truncate the fraction of frame value FF of the time code (01:00:10:07.3 for example)

held in the time code hold portion 21, the time code after the adjustment (01:00:10:07 for example) is converted into a timeline time which is transmitted to the CG image generation block 11 for restarting the progression. By doing this adjustment, the restarted CG animation is outputted starting from the frame of time code 01:00:10:08. Consequently, the outputted frame can be completed matched with the time code displayed on the display section 31 of the operation input block 16. In addition, the reproduction of the video materials of the VTR 12 and the video server 13 using a time code having no fraction in the frame value can be completed synchronized with the progression of the CG animation. To be more specific, with the video materials of the VTR 12 and so on, there is no state having a fraction such as frame value FF being 01:00:10:07.3 and therefore an image is formed only by outputting 01:00:10:07 two or more times, so that, if the CG animation is stopped halfway, the image remains as 01:00:10:07, thereby presenting no problem if the CG animation is outputted starting from the frame of 01:00:10:08 in restarting the progression next. Hence, there occurs no deviation in image from the CG image generation block, allowing the synchronization of images intended by the operator to be maintained.

Third Pattern

In the case where the progression of a CG animation is restarted at −1× speed after the stop from the slow progression which is other than −1× speed (namely, if the progression is restarted in the reverse direction), the adjustment is executed to truncate the fraction of frame value FF of the time code (01:00:10:07.3 for example) held in the time code hold portion 21, the time code after the adjustment (01:00:10:07) is converted into a timeline time, and this timeline time is transmitted to the CG image generation block 11 for restarting the progression. When this adjustment is executed, the restarted CG animation is outputted starting from the frame of time code 01:00:10:06. In addition, the synchronization in image with devices such as a VTR can be maintained.

It should be noted however that, if the progression is restarted at −1× speed, the adjustment may be executed to round up the fraction of frame value FF. If the round-up adjustment is executed, the time code after the adjustment becomes 01:00:10:08, so that the restarted CG animation is outputted starting from the frame of time code 01:00:10:07, thereby causing no reverse movement that the progression of video is restarted after moving back to the state before the stop.

Fourth Pattern

If the progression of a CG animation is restarted at a speed with the absolute value thereof being 1 or higher after the stop from the slow progression (including the progression in the inverse direction), no unnatural feeling is given in visual effects because of a high speed, so that the progression may be restarted by executing the adjustment of truncating the fraction of frame value FF of the time code (01:00:10:07.3 for example) held in the time code hold portion 21 to convert the adjusted time code (01:00:10:07 for example) into a timeline time which is transmitted to the CG image generation block 11. It should be noted that, in the case of the reverse progression, the adjustment for rounding up the fraction of frame value FF may be executed.

Consequently, if the speed of the progression is 2.1× for example and the frame value of the time code at the time of restart is an integer, the time code becomes an integer again after several frames (in the case of 2.1, the frame value becomes an integer again at the 10th frame), which is convenient in synchronizing the reproduction of a video material of the VTR 12 or the like with the image.

Fifth Pattern

It should be noted that, only if the absolute value of the speed at which to restart the progression of a CG animation stopped from the slow progression is higher than a predetermined threshold value, the adjustment of truncating the fraction of frame value FF of the time code held in the time code hold portion 21 may be executed.

If a cue-up operation (an operation for instantaneous movement up to the time code specified) is executed on the CG image generation block 11, a time code having no fraction in frame value FF is specified from the movement source regardless of whether the frame value FF of the time code held in the time code hold portion 21 has a fraction or not and the time code value is converted into a timeline time, which is transmitted to the CG image generation block 11. As a result, if a cue-up operation is specified for a time code having no fraction with the progression stopped in a state where frame value FF has a fraction, the time code is moved on the timeline up to a state having no fraction.

Figure 6:
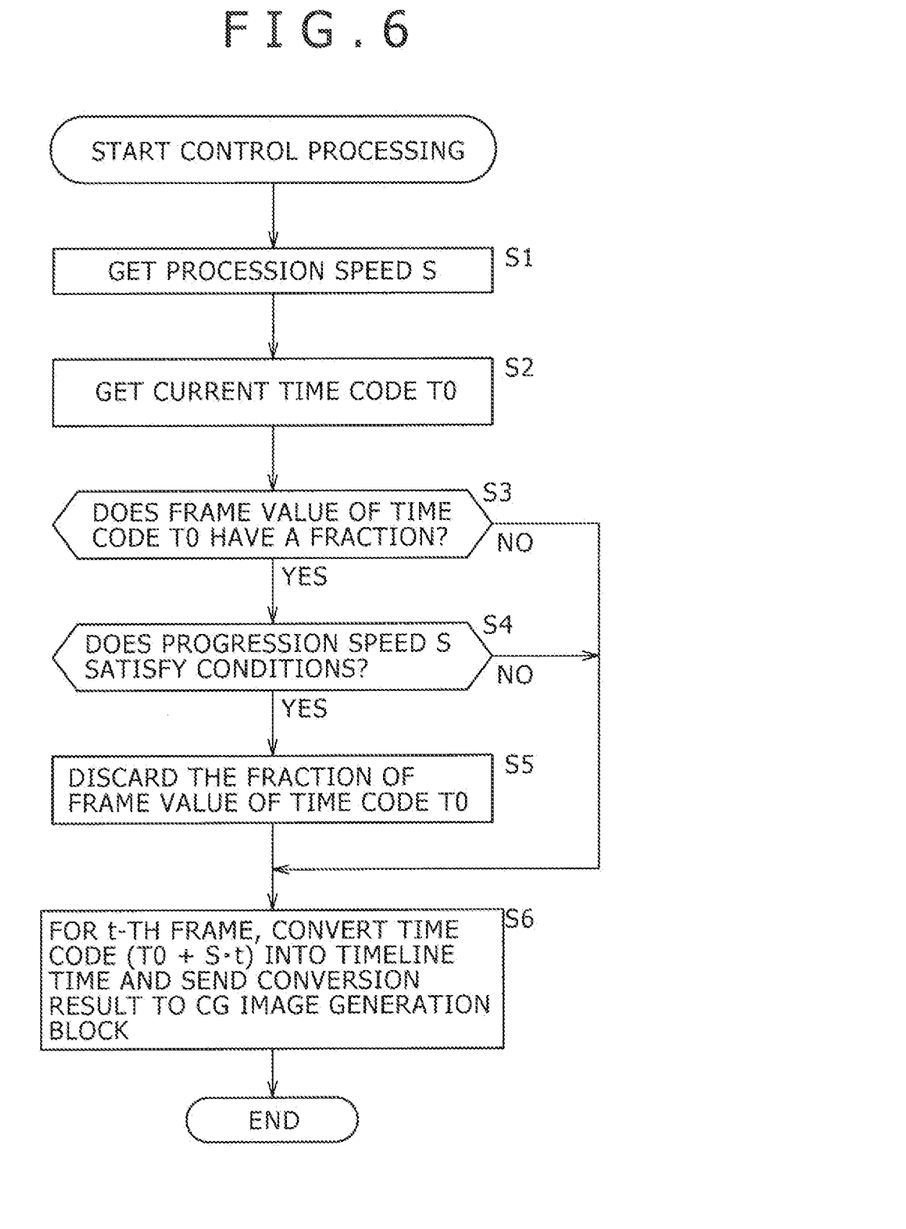
FIG. 6 is a flowchart indicative of control processing to be executed by a CG image generation block shown in FIG. 3.

Referring to FIG. 6, there is shown a flowchart indicative of processing of controlling the processing of the first through fifth patterns mentioned above, namely, the processing (hereafter referred to simply as control processing) of controlling the CG image generation block 11 through the operation input block 16.

This control processing is started when the progression of a CG animation is specified to be started after the stop of the progression of the CG animation.

It should be noted that if the progression of a CG animation is stopped before executing this control processing, it is assumed that the time code adjustment portion 22 shown in FIG. 4 stores progression speed S0 up to stop. It is also assumed that the time code hold portion 21 shown in FIG. 4 holds time code T0 with a fraction permitted for frame value FF as information indicative of a temporal position of a stopped CG animation.

In step S1, the time code adjustment portion 22 obtains progression speed S of a CG animation specified for start, namely, a value specified by the editor by use of the jog shuttle dial 34 of the operation input block 16. In step S2, the time code adjustment portion 22 obtains time code T0 held in the time code hold portion 21.

In step S3, the time code adjustment portion 22 determines whether frame value FF of the obtained time code T0 has a fraction or not. If a fraction is found, the procedure goes to step S4. If no fraction is found in frame value FF of obtained time code T0, then the time code adjustment portion 22 notifies the time code/timeline time conversion portion 23 of time code T0, upon which the procedure goes to step S6.

In step S4, the time code adjustment portion 22 determines whether progression speed S at the time of start obtained in step S1 satisfies a predetermined condition or not. Depending on a determination result, the procedure goes to step S5 or step S6 by skipping step S5.

To be more specific, if progression speed S is equal to progression speed S0 (pattern 1), then the time code adjustment portion 22 notifies the time code/timeline time conversion portion 23 of time code T0 having a fraction in frame value FF, upon which the procedure goes to step S6. If the absolute value of progression speed S is found to be 1 or higher (pattern 2 through pattern 4), then the procedure goes to step S5. It should be noted that, only if the absolute value of progression speed S is higher than a predetermined threshold value (pattern 5), the procedure may go to step S5.

In step S5, the time code adjustment portion 22 executes the adjustment of truncating the fraction of time code T0 obtained in step S2 and having the fraction in frame value FF and then notifies the time code/timeline time conversion portion 23 of the adjusted time code T0.

In step S6, the time code/timeline time conversion portion 23 converts time code T0 received from the time code adjustment portion 22 into a timeline time and sequentially computes timeline times corresponding to the frames after the start of progression, notifying the CG image generation block 11 of the results of the computation.

For example, if time code T0 at the stop of a CG animation is 01:00:00:05.75, progression speed S0 up to the stop is ¼×, and the progression speed after the resumption is 2×, then the procedure goes to step S5, in which time code T0 is adjusted to 01:00:00:05.

Next, time code T0=01:00:00:05 is converted into timeline time 01:00:(5×⅟30). Further, after the start of progression at a speed of 2×, in order for the frame of time code 01:00:00:07 to be rendered, in order for the frame of time code 01:00:00:09 to be rendered, and in order for the frame of time code 01:00:00:11 to be rendered, timeline times for these time codes are computed for the frames to be outputted.

To be more specific, in order to get time code 01:00:00:07, timeline time is computed as 01:00:((5×⅟30)+(2×1×⅟30)). Next, in order to get time code 01:00:00:09, timeline time is computed as 01:00:((5×⅟30)+(2×2×⅟30)). Further, in order to get time code 01:00:00:11, timeline time is computed as 01:00:((5×⅟30)+(2×3×⅟30)). Thus, computing timeline times in each time in progression not by addition but by multiplication can prevent accumulated errors of fractions.

It should be noted that the processing of step S3 itself mentioned above may be omitted. Namely, after step S2, the procedure may be moved to step S4. In this case, if no fraction is found in frame value FF of time code T0 in step S5, the adjustment of truncating the fraction is not substantially executed.

The control processing through the operation input block 16 has been described. It should be noted that the control processing (adjustment of time code) may be executed only when a video material from the VTR 12 or the video server 13 is synchronized with a CG animation. To be more specific, from the operation input block 16, similar instructions (or control signals) may be simultaneously transmitted to the CG image generation block 11, the VTR 12, and the video server 13 in order to play or stop the synchronized images.

In synchronizing a video material from the VTR 12 or the video server 13 with a CG animation, time code T0 may be adjusted even if progression speed S is the same as progression speed S0. Components other than the CG image generation block 11 must always prepare for the adjustment of time code T0 because no fraction occurs in frame value FF (or frame number) at the time of stop.

It should be noted that the above description about the truncation of fractions assumes that video be progressive, so that, in the case where video is interlace, the fractions may be truncated in units of 0.5

In the above-mentioned embodiments, the operation input block 16 holds and manages the decimal point parts (or fractional numbers) lower than the frame unit of time code or timeline time, the operation input block 16 being the control section common to the other devices. It is also practicable to execute this management of fractions inside the CG image generation block 11. In this case, the setting value providing the reference of the fractional number processing can be held in the CG image generation block 11, this setting value being settable from the operation input block 16.

In this case, the CG image generation block 11, the VTR 12, and the video server 13 are controlled always by use of time codes having no fraction from the operation input block 16. The CG image generation block 11 communities with the operation input block 16 by use of time codes having no fraction, thereby providing a function similar to the VTR 12 and so on.

In the case where the processing of truncating fractions in a particular case is executed by the CG image generation block 11 in the embodiment, if instructions of reproduction (or progression) and stop are simultaneously and repetitively issued from the operation input block 16 to the VTR 12 and so on and the CG image generation block 11, then synchronization can be maintained to control the system without involving the deviation in the progression of time codes of the devices of the system.

For example, assume that the progression of a CG animation from a state in which a time code of the VTR 12 is 01:30:00:00 and a time code of the CG image generation block 11 is 02:10:20:00 at a speed of 0.125 be instructed from the operation input block 16. If a stop is specified 31 seconds later, then the CG animation progresses by 31×0.125×30=116.25 frames, so that the time code in the VTR 12 stops at 01:30:03:26 and the time code in the CG image generation block 11 stops at 02:10:23:26.25. Next, if no fraction processing is executed when the progression is specified at the same speed for example, the CG animation progresses having a fraction of 0.25 in the internal time code between the VTR 12 and the CG image generation block 11. Repeating these stop and start operations accumulates differences, resulting in a difference in progression between the VTR 12 and the CG image generation block 11 even in a frame unit with fractions excluded. Consequently, if materials have the same length (or temporal length), a difference may occur in the end of material between the VTR 12 and the CG image generation block 11 or a gradual deviation may occur if the movements of images to be superimposed in the image synthesis block 15 are matched with each other. The present embodiments of the technology are intended to prevent these difference and deviation from occurring.

It should be noted that, with the CG image generation block 11, a timeline time held as a fraction may be in a format of seconds rather than in the time code format. Managing fractions (or decimal point parts) regardless of the data format of the time inside the computer can provide the effects of the present technology. Preparing decimal point parts in a sufficient number of digits in accordance with reproduction speeds having fractions such as slow progression can realize the present embodiments of the technology.

The systems to which the present embodiments of the technology are applicable include an editing system for editing video and a system installed on a television production truck for creating relay video on sites such as sport arenas in addition to devices (or studio circuits) for executing control in studio sub control room for executing selection, synthesis, and manipulation of video to be broadcast. With any systems, the embodiments of the technology are advantageous in the cooperation between a device and a CG apparatus that are controlled by time code.

The above-mentioned sequence of processing operations may be executed by software as well as hardware. When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

Figure 7:
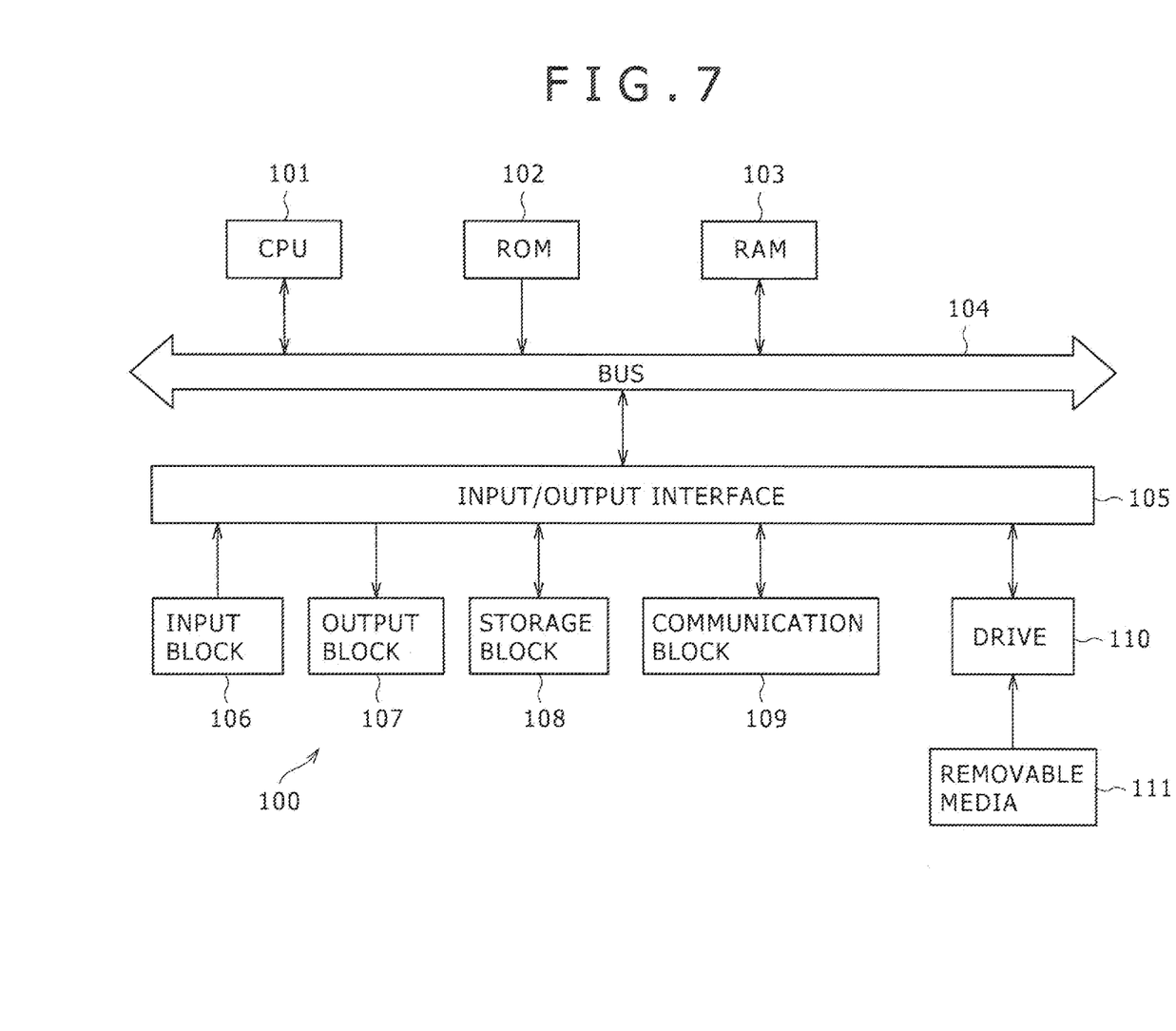
FIG. 7 is a block diagram illustrating an exemplary configuration of a general-purpose computer.

Referring to FIG. 7, there is shown a block diagram illustrating an exemplary hardware configuration of a computer that executes the above-mentioned sequence of processing by software programs.

In this computer 100, a CPU (Central Processing Unit) 101, a ROM (Read Only Memory) 102, and a RAM (Random Access Memory) 103 are interconnected by a bus 104.

The bus 104 is connected to an input/output interface 105. The input/output interface 105 is connected to an input block 106 made up of a keyboard, a mouse, and a microphone, for example, an output block 107 made up of a monitor display and a loudspeaker, for example, a storage block 108 made up of a hard disk drive or a nonvolatile memory, for example, a communication block 109 made up of a network interface for example, and a drive 110 for driving a removable media 111, such as a magnetic disk, an optical disk, a magneto-optical disk, or a semiconductor memory.

In the computer 100 configured as described above, the CPU 101 loads programs from the storage block 108 into the RAM 103 via the input/output interface 105 and the bus 104 and executes loaded programs, thereby executing the above-mentioned sequence of processing.

It should be noted that the programs to be executed by the computer may be executed in a time-dependent manner in the sequences described herein or in parallel or on an on-demand basis.

It should also be noted that programs may be processed by one unit of computer or by two or more units of computers in a distributed manner. Further, programs may be transmitted to a remote computer to be executed.

While preferred embodiments of the present technology have been described using specific terms, such description is for illustrative purpose only, and it is to be understood that changes and variations may be made without departing from the spirit or scope of the following claims.

It should also be noted that term "system" as used herein denotes an entire apparatus configured by a plurality of component units.

The present disclosure contains subject matter related to that disclosed in Japanese Priority Patent Application JP 2010-199498 filed in the Japan Patent Office on Sep. 7, 2010, the entire content of which is hereby incorporated by reference.

What is claimed is:

1. An information processing apparatus configured to process video, comprising:
a computer graphics image generation block configured to execute realtime rendering of a computer graphics animation by use of a timeline time indicative of a temporal position of said computer graphics animation;
an operation input block configured to enter a user operation for specifying progression of said computer graphics animation; and
a control block configured to control said computer graphics image generation block in response to said user operation entered through said operation input block,
wherein said control block has
a hold portion configured to hold time code HH:MM:SS:FF as a parameter indicative of stopped temporal position when the progression of said computer graphics animation being realtime rendered is stopped, frame value FF of the time code HH:MM:SS:FF being in decimal form which includes a value to the right side of a decimal point; and
a conversion portion configured to convert said time code HH:MM:SS:FF held in said hold portion into said timeline time and notify said computer graphics image generation block of said timeline time,
wherein said control block further has an adjustment portion configured to execute adjustment of removing a fraction occurring in frame value FF of said time code HH:MM:SS:FF held in said hold portion, and
wherein said conversion portion converts said time code HH:MM:SS:FF after conversion into said timeline time.

2. The information processing apparatus according to claim 1, wherein, if the progression of said computer graphics animation being realtime rendered is stopped and then restarted, said adjustment portion executes said adjustment only when a progression speed after the restart satisfies a predetermined condition.

3. The information processing apparatus according to claim 1, wherein, if the progression of said computer graphics animation being realtime rendered is stopped and then restarted and a progression speed after the restart is equal to a progression speed before the stop, said adjustment portion does not execute said adjustment.

4. The information processing apparatus according to claim 1, wherein
said control block further controls a video output block that uses said time code as a parameter indicative of a temporal position in response to said user operation entered through said operation input block and
said adjustment portion executes said adjustment only when the progression of said computer graphics animation being realtime rendered is synchronized with a video material outputted from said video output block.

5. An information processing method for an information processing apparatus having a computer graphics image generation block configured to realtime render a computer graphics animation by use of a timeline time indicative of a temporal position of said computer graphics animation, comprising:
entering a user operation for specifying progression of said computer graphics animation; and
controlling said computer graphics image generation block in response to said user operation entered by said entering step,
wherein said control step
holds time code HH:MM:SS:FF as a parameter indicative of stopped temporal position when the progression of said computer graphics animation being realtime rendered is stopped, frame value FF of the time code HH:MM:SS:FF being in decimal form which includes a value to the right side of a decimal point, and
converts said held time code HH:MM:SS:FF into said timeline time and notifies said computer graphics image generation block of said timeline time,
wherein said control step further has an adjustment step for executing adjustment of removing a fraction occurring in frame value FF of said time code HH:MM:SS:FF held in said hold step, and
wherein said conversion step converts said time code HH:MM:SS:FF after conversion into said timeline time.

6. A non-transitory computer-readable recording medium for storing a computer program that when executed on a computer causes the computer to function as
a computer graphics image generation block configured to execute realtime rendering of a computer graphics animation by use of a timeline time indicative of a temporal position of said computer graphics animation;

an operation input block configured to enter a user operation for specifying progression of said computer graphics animation; and a control block configured to control said computer graphics image generation block in response to said user operation entered through said operation input block, wherein said control block has a hold portion configured to hold time code HH:MM:SS:FF as a parameter indicative of stopped temporal position when the progression of said computer graphics animation being realtime rendered is stopped, frame value FF of the time code HH:MM:SS:FF being in decimal form which includes a value to the right side of a decimal point; and a conversion portion configured to convert said time code HH:MM:SS:FF held in said hold portion into said timeline time and notify said computer graphics image generation block of said timeline time, wherein said control block further has an adjustment portion configured to execute adjustment of removing a fraction occurring in frame value FF of said time code HH:MM:SS:FF held in said hold portion, and wherein said conversion portion converts said time code HH:MM:SS:FF after conversion into said timeline time.

* * * * *